United States Patent
Kubo

[11] Patent Number: 5,708,309
[45] Date of Patent: Jan. 13, 1998

[54] POWER SUPPLY CONTROL CIRCUIT AND COMPUTER GAME MACHINE USING SUCH CIRCUIT

[75] Inventor: Manabu Kubo, Tokyo, Japan

[73] Assignee: Sega Enterprises, Ltd., Japan

[21] Appl. No.: 721,383

[22] Filed: Sep. 26, 1996

Related U.S. Application Data

[63] Continuation of Ser. No. 364,208, Dec. 27, 1994, abandoned.

[30] Foreign Application Priority Data

Dec. 28, 1993 [JP] Japan .................. 5-337291

[51] Int. Cl.$^6$ ............................................. H01H 35/00
[52] U.S. Cl. .................... 307/126; 307/113; 307/116; 307/119; 307/140; 473/24; 473/44
[58] Field of Search ........................ 307/112, 113, 307/115, 116, 125, 126, 139, 140, 326, 119, 132 R; 273/148 B; 361/684, 686; 395/280, 283, 281, 282; 369/75.1, 79, 71, 149, 150, 154, 143; 463/24, 42, 43, 44, 45, 46, 47

[56] References Cited

U.S. PATENT DOCUMENTS 4,579,338 4/1986 Heffron .................. 273/434
4,995,027 2/1991 Aoyagi .................. 369/77.1
5,460,374 10/1995 Owaki .................. 273/148 B

FOREIGN PATENT DOCUMENTS

| 62-46929 | 3/1987 | Japan . |
| 62-48552 | 3/1987 | Japan . |
| 2-15151 | 4/1990 | Japan . |
| 2-49595 | 4/1990 | Japan . |
| 60-3998 | 1/1992 | Japan . |
| 4-352981 | 12/1992 | Japan . |
| 6-89566 | 3/1994 | Japan . |

*Primary Examiner*—William M. Shoop, Jr.
*Assistant Examiner*—Jonathan Kaplan
*Attorney, Agent, or Firm*—Dickstein Shapiro Morin & Oshinsky LLP

[57] ABSTRACT

A power supply control circuit controls power supply to a circuit when an external unit is connected to and/or disconnected from a terminal unit to which the circuit is coupled. The power supply control circuit includes a first sensor for detecting whether or not the external unit is in a first state where the external unit is close to the terminal unit, a second sensor for detecting whether or not external unit which has been already connected to the terminal unit is in a second state, and a control circuit for controlling the power supply to the circuit in accordance with detecting results obtained by the first and second sensors. In addition the above power supply control circuit is applied to a computer game machine having a main circuit coupled to a cartridge slot to which a cartridge is to be connected.

13 Claims, 6 Drawing Sheets

POWER SUPPLY CONTROL CIRCUIT AND COMPUTER GAME MACHINE USING SUCH CIRCUIT

This application is a continuation, of application Ser. No. 08/364,208, filed Dec. 27, 1994, now abandoned.

BACKGROUND OF THE INVENTION (1) Field of the Invention

The present invention generally relates to a power supply control circuit and a computer game machine using such circuit, and more particularly to a power supply control circuit for controlling power connection and disconnection to and from a main circuit and computer game machine to which the power supply control circuit is applied.

(2) Description of Related Art

In a conventional computer game machine, as shown in FIG. 1, a compact disk drive unit (CD drive unit) 11 is built into a machine body 10 and a cartridge slot 12 is provided, as an external input/output terminal, in the machine body 10. A cartridge 15 including an extender circuit, such as memory in which game-software is stored or an electronic circuit, is put into the cartridge slot 12 so that the extender circuit is electrically connected to the machine body 10.

In the above computer game machine, under a condition in which no cartridge is connected to the machine body 10, a game may be played in accordance with game-software reproduced from the CD drive unit 11. Alternately, under a condition in which the cartridge 15 is connected to the machine body 10, a game may be played in accordance with game software read out from a memory in the cartridge 15.

When connection or disconnection of the cartridge 15 to or from the machine body 10 is carried out under a condition in which power is supplied to the machine body 10, static electricity may be generated due to contact of terminals with each other, an overcurrent may flow into signal lines, and/or an erroneous operation may occur due to a contact error between the machine body 10 and the cartridge 15. As a result, it is apprehended that an electronic circuit in the machine body 10 will break down and/or electronic information in the memory of the cartridge 15 will be destroyed.

Thus, in the conventional game machine, a first stopper is mechanically projected, in response to an operation for turning on a power switch 13, so as to prevent a shutter covering the cartridge slot 12 from opening. As a result, the cartridge 15 is prevented from being put into the cartridge slot 12 under a condition in which power is supplied to circuits of the game machine. In addition, after the cartridge 15 is put into the cartridge slot 12, a second stopper is mechanically projected, in response to an operation for turning on the power switch 13, so as to be enegaged with an engage portion provided on the cartridge 15. As a result, the cartridge 15 is prevented from being disconnected from the cartridge slot 12.

However, since the first and second stoppers are mechanically driven, the driving mechanism for the first and second stoppers is enlarged. The driving mechanism can not be thus mounted in a limited space in the machine body 10. Furthermore, if the power is supplied to the machine body 10, the power supply must first be turned off in order to connect or disconnect the cartridge 15 to or from the cartridge slot 12. After the cartridge 15 is connected to or disconnected from the cartridge slot 12, an operation for turning on the power supply must be carried Out again. Thus, there is a disadvantage in that operations for controlling power supply to a circuit is more complex.

SUMMARY OF THE INVENTION

Accordingly, a general object of the present invention is to provide a novel and useful power supply control circuit and a game machine using such circuit in which the disadvantages of the aforementioned prior art are eliminated.

A more specific object of the present invention is to provide a power supply control circuit which can be miniaturized.

Another object of the present invention is to provide a power supply control circuit which can be arranged in a machine body with an improved degree of freedom.

Still another object of the present invention is to provide a power supply control circuit which can control power supply to a circuit by simple operations.

The above objects of the present invention are achieved by power supply control circuit for controlling power supply to a circuit when an external unit is connected to a terminal unit to which the circuit is coupled, the power supply control circuit comprising: first detecting means for detecting whether or not the external unit is in a first state where the external unit is close to the terminal unit; second detecting means for detecting whether or not the external unit which has been already connected to the terminal unit is in a second state; and control means for, when the first detecting means detects that the external unit is in the first state before the second detecting means detects that the external unit is in the second state, discontinuing power supply to the circuit and for, when the second detecting means detects that the external unit is in the second state after the first detecting means detects the external unit is in the first state, restarting the power supply to the circuit.

According to the present invention described above, based on the detecting results obtained by the first and second detecting means, the power supply to the circuit is discontinued immediately before the external circuit is connected to the terminal unit and the power supply to the circuit is restarted immediately after the external circuit is connected to the terminal unit. Since it is not necessary for the power supply control circuit according to the present invention to provide mechanisms for preventing the external unit from being connected to the terminal unit, the power supply control circuit can be miniaturized.

In addition, the degree of freedom with which the first and second detecting means and the control means can be arranged is superior to the degree of freedom with which the mechanisms needed for the conventional system can be arranged.

Furthermore, when the external unit is connected to the terminal unit, the power supply to the circuit can be automatically controlled. Thus, the power supply to the circuit can be carried out by simple operations.

The above objects of the present invention are also achieved by a power supply control circuit for controlling power supply to a circuit when an external unit is disconnected from a terminal unit to which the circuit is coupled, the power supply control circuit comprising: first detecting means for detecting whether or not the external unit is in a first state where the external unit is close to the terminal unit; second detecting means for detecting whether or not the external unit which has been already connected to the terminal unit is in a second state; and control means for, when the second detecting means detects that the external unit which has been connected to the terminal unit is not in the second state before the first detecting means detects that the external unit is not in the first state, discontinuing the power supply to the circuit and for, when the first detecting means detects that the external unit is not in the first state after the second detecting means detects that the external unit is not in the second state, restarting the power supply to the circuit.

According to the present invention as described above, based on the detecting results obtained by the first and second detecting means, the power supply to the circuit is discontinued immediately before the external unit is disconnected from the terminal unit and the power supply to the circuit is restarted immediately after the external unit is completely disconnected from the terminal unit.

Still another object of the present invention is to provide a computer game machine to which the above power supply control circuit is applied.

The object of the present invention is achieved by a computer game machine comprising: a cartridge slot into which a cartridge should be connected; a main circuit, coupled to the cartridge slot, for carrying out a process in accordance with information supplied from the cartridge connected to the cartridge slot; first detecting means for detecting whether or not a cartridge is in a first state where the cartridge is close to the cartridge slot; second detecting means for detecting whether or not the cartridge which has been already connected to the cartridge slot is in a second state: and control means for, when the first detecting means detects that the cartridge is in the first state before the second detecting means detects that the cartridge is in the second state, discontinuing power supply to the main circuit and for, when the second detecting means detects that the cartridge is in the second state after the first detecting means detects the cartridge is in the first state, restarting the power supply to the main circuit.

The above objects of the present invention are also achieved by a computer game machine comprising: a cartridge slot into which a cartridge should be connected; a main circuit, coupled to the cartridge slot, for carrying out a process in accordance with information supplied from the cartridge connected to the cartridge slot; first detecting means for detecting whether or not a cartridge is in a first state where the cartridge is close to the cartridge slot; second detecting means for detecting whether or not the cartridge which has been already connected to the cartridge slot is in a second state; and control means for, when the second detecting means detects that the cartridge which has been connected to the cartridge slot is not in the second state before the first detecting means detects that the cartridge is not in the first state, discontinuing the power supply to the main circuit and for, when the first detecting means detects that the cartridge is not the first state after the second detecting means detects that the cartridge is not the second state, restarting the power supply to the main circuit.

According to the present invention as described above, the computer game machines to which the above power supply control circuits are applied can be provided.

BRIEF DESCRIPTION OF THE DRAWINGS

Other objects, features and advantages of the present invention will become apparent from the following detailed description when read in conjunction with the accompanying drawings in which.

DESCRIPTION OF THE PREFERRED EMBODIMENTS

A description will be given of an embodiment of the present invention.

Figure 1:
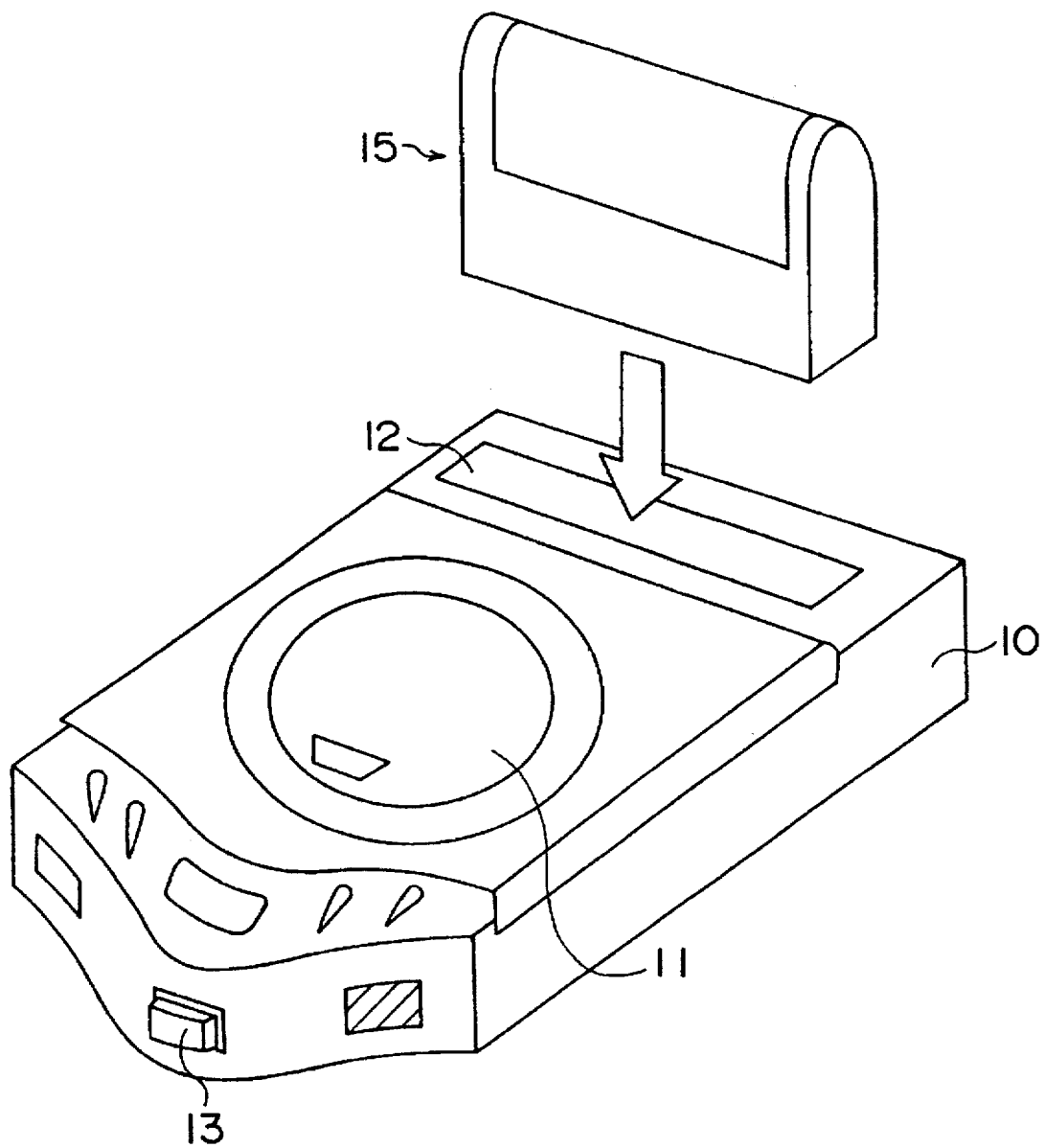
FIG. 1 is a perspective view of a computer game machine to which the present invention is applicable.
Figure 2:
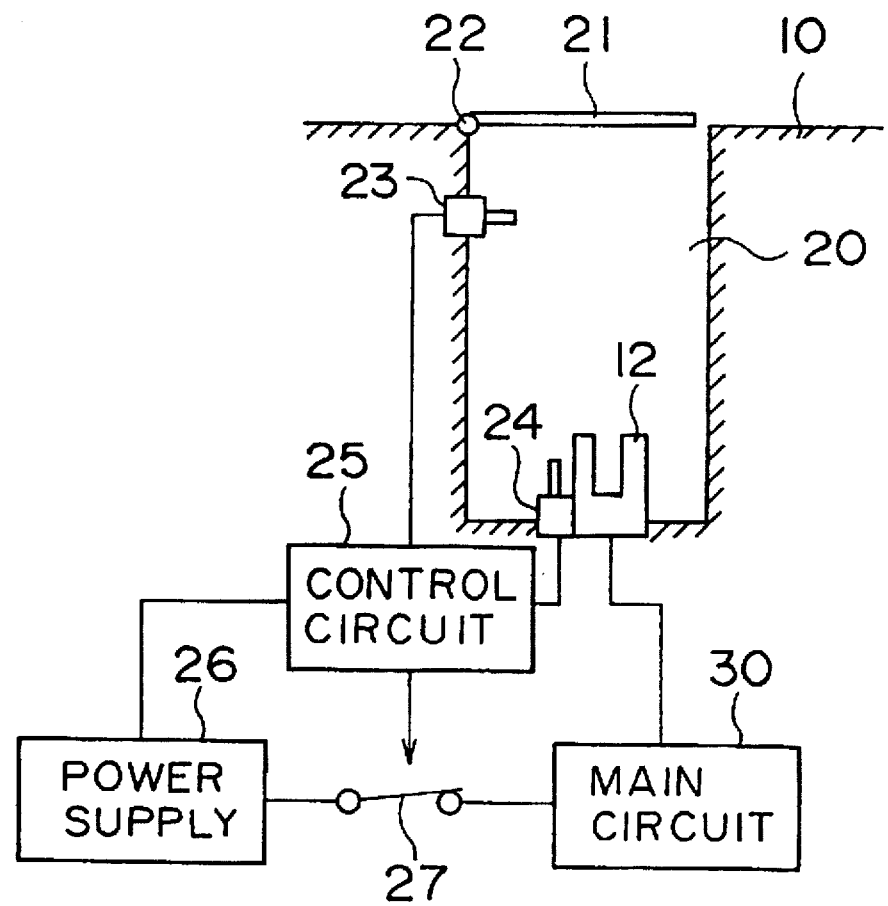
FIG. 2 is a block diagram illustrating a power supply control circuit according to an embodiment of the present invention.

A power supply control circuit according to an embodiment of the present invention is applied, for example, to a computer game machine as shown in FIG. 1. The power supply control circuit is essentially formed as shown in FIG. 2. In FIG. 2, those parts which are the same as those shown in FIG. 1 are given the same reference numbers.

Referring to FIG. 2, a concave portion 20 into which a cartridge should be inserted is formed in the machine body 10. A shutter 21 is pivotably supported by a shaft 22 which extends along an edge of the concave portion 20. A spring (not shown) normally applies a biased force to the shutter 21 so that the shutter 21 covers an opening of the concave portion 20.

The cartridge slot 12 is fixed on the bottom surface of the concave portion 20. A first microswitch 23 is fixed on an inner side wall of the concave portion 20 at a position at which the first microswitch 23 is pushed by the shutter 21 pivoted on the shaft 22. A second microswitch 24 is fixed on the bottom surface of the concave portion 20 so as to be adjacent no the cartridge slot 12.

The first microswitch 23 is normally in an off-state. When the shutter 21 pivoted by a cartridge inserted into the concave portion 20 pushes the first microswitch 23, the first microswitch 23 is turned on. The second microswitch 24 is normally in an off-skate. When a cartridge inserted into the concave portion is put in the cartridge slot 12, the second microswitch 24 is operated. After the cartridge is completely electrically connected to the cartridge slot 12, the second microswitch 24 is turned on. When the cartridge is pulled from the cartridge slot 12, the second microswitch 24 is turned off before the cartridge is completely electrically disconnected from the cartridge slot 12. That is, after the second microswitch 24 is turned off, the cartridge is completely electrically disconnected from the cartridge slot 12.

Detecting signals which are in an on-state or an off-state are supplied from the first and second microswitches 23 and 24 to a control circuit 25. The control circuit 25 is directly coupled to a power supply circuit 26 so that power is always supplied from the power supply circuit 26 to the control circuit 25. A main circuit 30 is connected to the cartridge slot 12, and carries out processes in accordance with game-software read out from the memory in the cartridge connected to the cartridge slot 12. The main circuit 30 is coupled to the bower supply circuit 26 via a power switch 27. When the power switch 27 is in the on-state, power is supplied to the main circuit 30 via the power switch 27 so that the main circuit 30 is activated- The power switch 27 can be manually operated in the same manner as the power switch 13 shown in FIG. 1, on and off operations of the power switch 27 being controlled by the control circuit 25.

Figure 3:
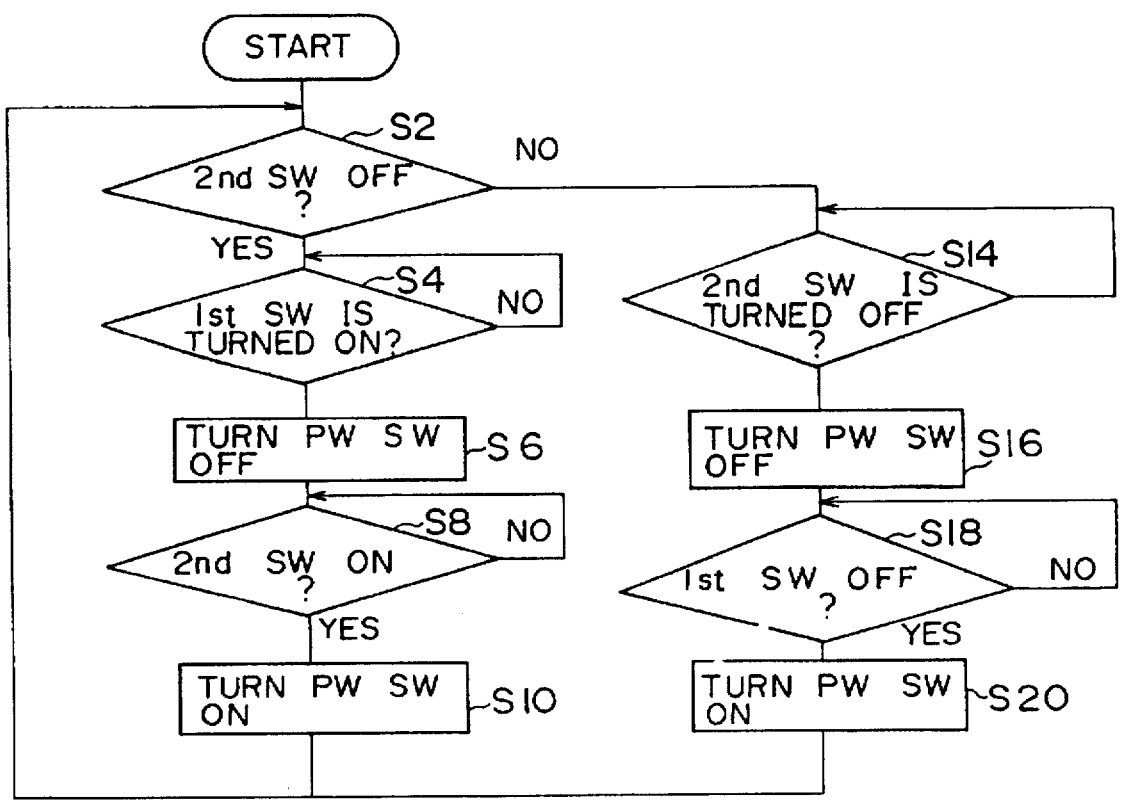
FIG. 3 is a flow chart illustrating a switching process carried out by the power supply control circuit shown in FIG. 2.

The control circuit 25 controls the on and off operations of the power switch 27 in accordance with a process (a switching process) shown in FIG. 3.

In an initial state where no cartridge is put in the cartridge slot 12, the first and second microswitches 23 and 24 are in the off-state. When the power switch 27 is manually turned on, power is supplied to the main circuit 30. In this state, reference to FIG. 3, the control circuit 25 determines, in step S2, whether or not the second microswitch 24 is in the off-state. When in is determined, in step S2, that the second microswitch 24 is in the off-state, the control circuit 25 further determines, in step S4, whether or not the first microswitch 23 is turned on. This determination step S4 is repeated until the first microswitch 23 is turned on.

Figure 4:
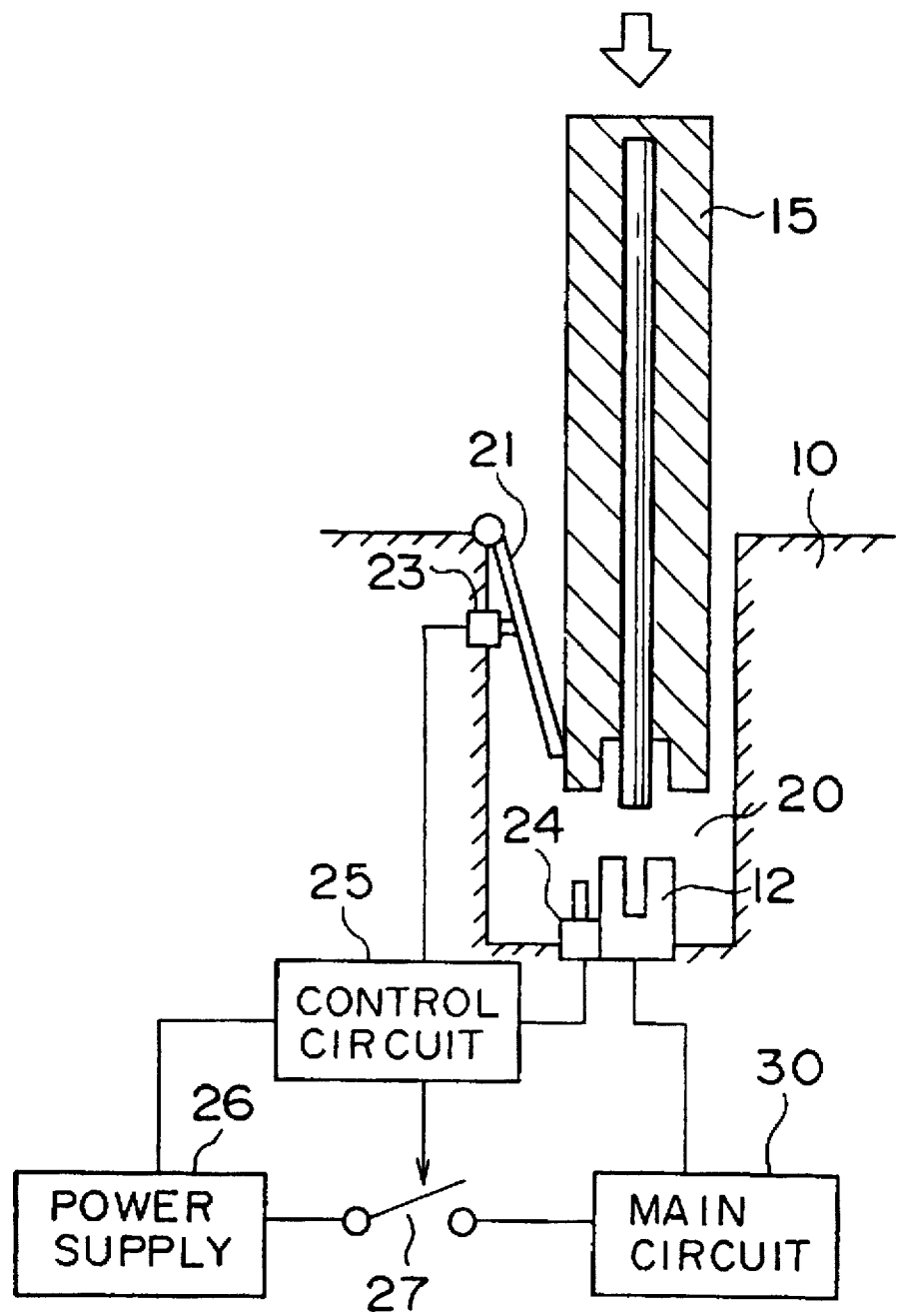
FIG. 4 is a diagram illustrating an operation of the power supply control circuit.

When the first microswitch 23 is pushed by the shutter 21 pivoted by insertion of a cartridge into the concave portion 20 of the machine body 10, as shown in FIG. 4, the control circuit 25 determines that the first microswitch 23 is turned on. The control circuit 25 then turns the power switch 27 off in step S6. As a result, the power supply to the main circuit 30 is discontinued. After this, the control circuit 25 determines, in step S8, whether or not the second microswitch 24 is turned on. This determination step S8 is repeated until the second microswitch 24 is turned on.

Figure 5:
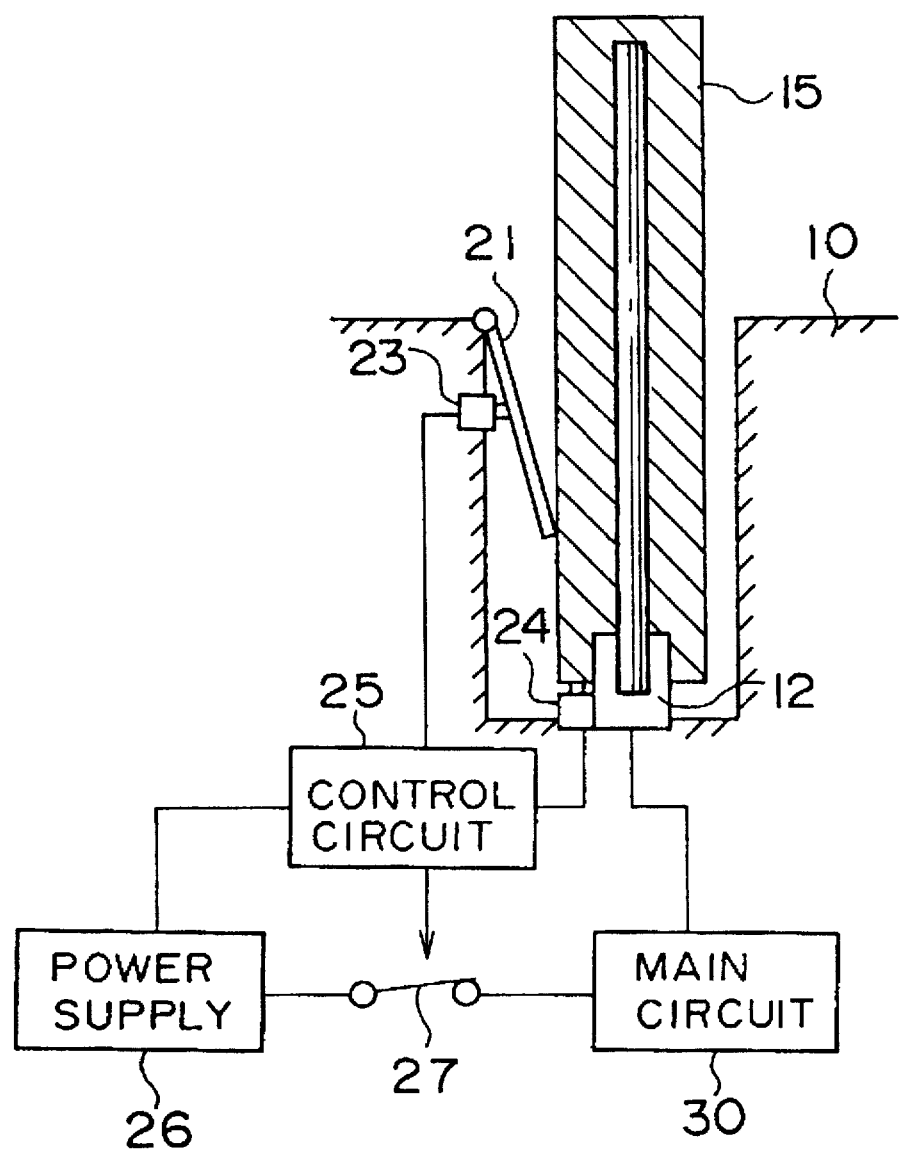
FIG. 5 is a diagram illustrating an operation of the power supply control circuit.

The cartridge is then further inserted in the concave portion 20. Immediately after the cartridge is put into the cartridge slot 12 so as to be electrically connected to the cartridge slot 12, the second microswitch 24 is pushed by the cartridge, as shown in FIG. 5. At this time, the control circuit 25 determines, in step S8, that the second microswitch is turned on. The control switch 25 then turns the power switch 27 on in step S10. As a result, the power supply to the main circuit 30 is restarted via the power switch 27. In this state, the main circuit 30 can carry out a process in accordance with the game-software stored in the memory in the cartridge.

According to the switching process, the power supply to the main circuit 30 connected to the cartridge slot 12 is automatically discontinued immediately before the cartridge is completely electrically connected to the cartridge slot 12. Immediately after the cartridge is completely electrically connected to the cartridge slot 12, the power supply to the main circuit 30 is automatically restarted via the power switch 27. Thus, when the cartridge is put into the cartridge slot 12, the main circuit 30 and a circuit in the cartridge are prevented from electrically breaking down.

Figure 6:
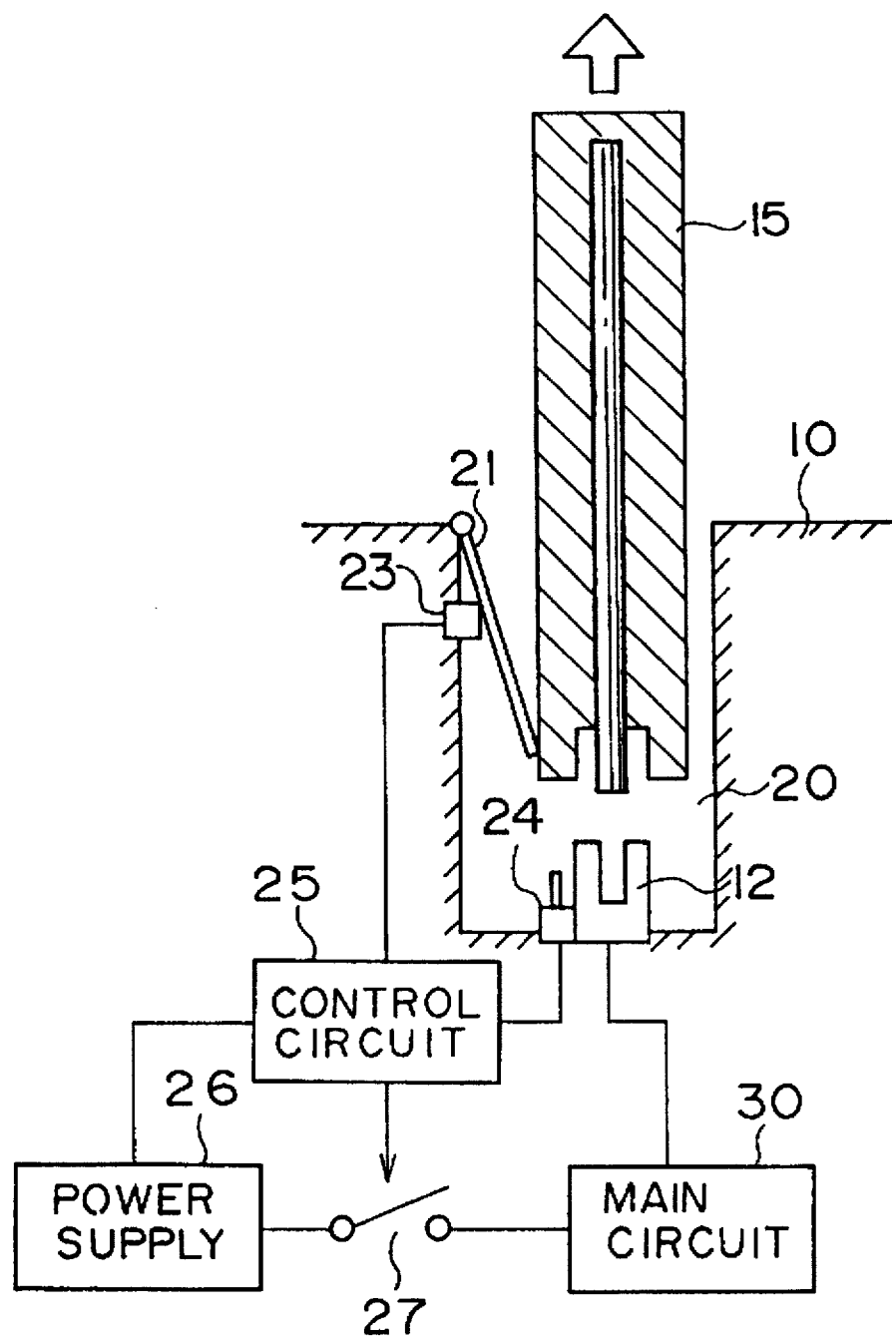
FIG. 6 is a diagram illustrating an operation of the power supply control circuit.

Returning to FIG. 3, after the power switch 27 is turned on in step S10, the process returns to step S2. Since the cartridge is put in the cartridge slot 12 in this case, the control circuit 25 determines, in step S2, that the second microswitch 24 is in the on-state. When it is determined that the second microswitch 24 is in the on-state, the process proceeds from step S2 to step S14. In step S14, the control circuit 25 determines whether or not the second microswitch 24 is turned off. This step S14 is repeated until the second microswitch 24 is turned off. The cartridge is pulled, and the second microswitch 24 is turned off before the cartridge is completely disconnected from the cartridge slot 12. At this time, the control circuit 25 determines that the second microswitch 24 is turned off. The control circuit 25 thus turns the power switch 27 off in step S16. As a result, the power supply to the main circuit 30 is discontinued before the cartridge is completely disconnected from the cartridge slot 12. After this, the cartridge is further pulled so as to be completely disconnected from the cartridge slot 12 as shown in FIG. 6.

After the power switch 27 is turned off in step S16, the control circuit 25 determines, in step S18, whether or non the first microswitch 23 is turned off. This Step S18 is repeated until the first microswitch 23 is turned off. When the cartridge is ejected from the concave portion 20 so chat the shutter 21 is separated from the first microswitch 23 as shown in FIG. 2, the first microswitch 23 is turned off. At this time, the control circuit 25 determines, in step S18, that the first microswitch 23 is turned off and turns the power switch 27 off in step S20. As a result, the power supply to the main circuit 30 is restarted via the power switch 27.

According to the above switching process, immediately before the cartridge is completely disconnected from the cartridge slot 12, the power supply to the main circuit 30 is automatically discontinued. Then, after the cartridge is completely disconnected from the cartridge slot 12, the power supply to the main circuit 30 is restarted. Thus, when the cartridge is disconnected from the cartridge slot 12, the main circuit 30 and the circuit in the cartridge are prevent from electrically breaking down.

According to the above embodiment, since the on and off operations of the power switch 27 are electrically controlled, the power supply control circuit can be miniaturized in comparison with a conventional mechanical system. In addition, since the power supply control circuit can be miniaturized, the degree of freedom with which the power supply control circuit including the first and second microswitches 23 and 24 and the control circuit 25 can be arranged, as shown in FIG. 2, is improved.

Other sensors, such as infrared sensors or photo coupler, may be substituted for the first and second microswitches 23 and 24.

The present invention is not limited to the aforementioned embodiments, and variations and modifications may be made without departing from the scope of the claimed invention.

What is claimed is:

1. A power supply control circuit for controlling power supply to a circuit when an external unit is connected to a terminal unit to which said circuit is coupled, said power supply control circuit comprising:

first detecting means for detecting whether or not said external unit is in a first state where said external unit is close to said terminal unit;

second detecting means for detecting whether or not said external unit which has been already connected to said terminal unit is in a second state; and control means for, when said first detecting means detects that said external unit is in the first state before said second detecting means detects that said external unit is in the second state, discontinuing power supply to said circuit and for, when said second detecting means detects that said external unit is in the second state after said first detecting means detects said external unit is in the first state, reconnecting the power supply to said circuit.

2. The power supply control circuit as claimed in claim 1, wherein said control means has:

a power switch;

a power supply unit coupled to said circuit via said power switch; and switching control means for, when said first detecting means detects that said external unit is in the first state before said second detecting means detects that said external unit is in the second state, turning said power switch off so that the power supply to said circuit is discontinued and for, when said second detecting means detects that said external unit is in the second state after said first detecting means detects that said external unit is in the first state, turning said power switch on so that the power supply to said circuit is reconnected.

3. A power supply control circuit for controlling power supply to a circuit when an external unit is disconnected from a terminal unit to which said circuit is coupled, said power supply control circuit comprising:

first detecting means for detecting whether or not said external unit is in a first state where said external unit is close to said terminal unit;

second detecting means for detecting whether or not said external unit which has been already connected to said terminal unit is in a second state; and control means for, when said second detecting means detects that said external unit which has been connected to said terminal unit is not in the second state before said first detecting means detects that said external unit is not in the first state, discontinuing the power supply to said circuit and for, when said first detecting means detects that said external unit is not in the first state after said second detecting means detects that said external unit is not in the second state, reconnecting the power supply to said circuit.

4. The power supply control circuit as claimed in claim 3, wherein said control means has:

a power switch;

a power supply unit coupled to said circuit via said power switch; and switching control means for, when said second detecting means detects that said external unit which has been connected to said terminal unit is not in the second state before said first detecting means detects that said external unit is not in the first state, turning said power switch off so that the power supply to said circuit is discontinued and for, when said first detecting means detects that said external unit is not in the first state after said second detecting means detects that said external unit is not in the second state, turning said power switch on so that the power supply to said circuit is reconnected.

5. A power supply control circuit for controlling power supply to a circuit when an external unit is connected to and disconnected from a terminal unit to which said circuit is coupled, said power supply control circuit comprising:

first detecting means for detecting whether or non said external unit is in a first state where said external unit is close to said terminal unit;

second detecting means for detecting whether or not said external unit which has been already connected to said terminal unit is in a second state; and control means for controlling the power supply to said circuit in accordance with detecting results obtained by said first detecting means and said second detecting means, said control means having:

first means for, when said first detecting means detects that said external unit is in the first state before said second detecting means detects that said external unit is in the second state, discontinuing the power supply to said circuit and for, when said second detecting means detects that said external unit is in the second state after said first detecting means detects that said external unit is in the first state, reconnecting the power supply to said circuit; and second means for, when said second detecting means detects that said external unit which has been connected to said terminal unit is not in the second state before said first detecting means detects that said external unit is not in the first state, discontinuing the power supply to said circuit and for, when said first detecting means detects that said external unit is not in the first state after said second detecting means detects that said external unit is not in the second state, reconnecting the power supply to said circuit.

6. The power supply control circuit as claimed in claim 5, wherein said control means includes:

a power switch; and a power supply unit coupled to said circuit via said power switch, wherein said first means has first switching means for, when said first detecting means detects that said external unit is in the first state before said second detecting means detects that said external unit is in the second state, turning said power switch off so that the power supply to said circuit is discontinued and for, when said second detecting means detects that said external unit is in the second state after said first detecting means detects said external unit is in the first state, turning said power switch on so that the power supply to said circuit is reconnected, and wherein said second means has second switching means for, when said second detecting means detects that said external unit which has been connected to said terminal unit is not in the second state before said first detecting means detects that said external unit is not in the first state, turning said power switch off so that the power supply to said circuit is discontinued and for, when said first detecting means detects that said external unit is not in the first state after said second detecting means detects that said external unit is not in the second state, turning said power switch on so that the power supply to said circuit is reconnected.

7. A computer game machine comprising:

a cartridge slot into which a cartridge is to be connected;

a main circuit, coupled to said cartridge slot, for carrying out a process in accordance with information supplied from said cartridge connected to said cartridge slot;

first detecting means for detecting whether or not a cartridge is in a first state where said cartridge is close to said cartridge slot;

second detecting means for detecting whether or not said cartridge which has been already connected to said cartridge slot is in a second state; and control means for, when said first detecting means detects that said cartridge is in the first state before said second detecting means detects that said cartridge is in the second state, discontinuing power supply to said main circuit and for, when said second detecting means detects that said cartridge is in the second state after said first detecting means detects said cartridge is in the first state, reconnecting the power supply to said main circuit.

8. The computer game machine as claimed in claim 7, wherein said control means has:

a power switch;

a power supply unit coupled to said main circuit via said power switch; and switching control means for, when said first detecting means detects that said cartridge is in the first state before said second detecting means detects that said cartridge is in the second state, turning said power switch off so that the power supply to said main circuit is discontinued and for, when said second detecting means detects that said cartridge is in the second state after said first detecting means detects that said cartridge is n the first state, turning said power switch on so that the power supply to said circuit is reconnected.

9. A computer game machine comprising:

a cartridge slot into which a cartridge is to be connected;

a main circuit, coupled to said cartridge slot, for carrying out a process in accordance with information supplied from said cartridge connected to said cartridge slot;

first detecting means for detecting whether or not a cartridge is in a first state where said cartridge is close to said cartridge slot;

second detecting means for detecting whether or not said cartridge which has been already connected to said cartridge slot is in a second state; and control means for, when said second detecting means detects that said cartridge which has been connected to said cartridge slot is not in the second state before said first detecting means detects that said cartridge is not in the first state, discontinuing the power supply to said main circuit and for, when said first detecting means detects that said cartridge is not in the first state after said second detecting means detects that said cartridge is not in the second state, reconnecting the power supply to said main circuit.

10. The computer game machine as claimed in claim 9, wherein said control means has:

a power switch;

a power supply unit coupled to said main circuit via said power switch switching control means for, when said second detecting means detects that said cartridge which has been connected to said terminal unit is not in the second state before said first detecting means detects that said cartridge is not in the first state, discontinuing the power supply to said main circuit and for, when said first detecting means detects that said cartridge is not in the first state after said second detecting means detects that said cartridge is not in the second state, reconnecting the power supply to said circuit.

11. A computer game machine comprising:

a cartridge slot into which a cartridge is to be connected;

a main circuit, coupled to said cartridge slot, for carrying out a process in accordance with information supplied from said cartridge connected to said cartridge slot;

first detecting means for detecting whether or not a cartridge is in a first state where said cartridge is close to said cartridge slot;

second detecting means for detecting whether or not said cartridge which has been already connected to said cartridge slot is in a second state; and control means for controlling the power supply to said main circuit in accordance with detecting results obtained by said first detecting means and said second detecting means, said control means having:

first means for, when said first detecting means detects that said cartridge is in the first state before said second detecting means detects that said cartridge is in the second state, discontinuing the power supply to said main circuit and for, when said second detecting means detects that said cartridge is in the second state after said first detecting means detects that said cartridge is in the first state, reconnecting the power supply to said circuit; and second means for, when said second detecting means detects that said cartridge which has been connected to said cartridge slot is not in the second state before said first detecting means detects that said cartridge is not in the first state, discontinuing the power supply to said main circuit and for, when said first detecting means detects that said cartridge is not in the first state after said second detecting means detects that cartridge is not in the second state, restarting the power supply to said circuit.

12. The computer game machine as claimed in claim 11, wherein said control means includes:

a power switch; and a power supply unit coupled to said main circuit via said power switch, wherein said first means has first switching means for, when said first detecting means detects that said cartridge is in the first state before said second detecting means detects that said cartridge is in the second state, turning said power switch off so that the power supply to said main circuit is discontinued and for, when said second detecting means detects that said cartridge is in the second state after said first detecting means detects said cartridge is in the first state, turning said power switch on so that the power supply to said main circuit is reconnected, and wherein said second means has second switching means for, when said second detecting means detects that said cartridge which has been connected to said cartridge slot is not in the second state before said first detecting means detects that said cartridge is not in the first state, turning said power switch off so that the power supply to said main circuit is discontinued and for, when said first detecting means detects that said cartridge is not in the first state after said second detecting means detects that said cartridge is not in the second state, turning said power switch on so that the power supply to said main circuit is reconnected.

13. The computer game machine as claimed in claim 12, wherein said computer game machine has a main body on which there is a concave portion, said cartridge slot being provided on a bottom surface of said concave portion, wherein said first detecting means has a first sensor for detecting the first state of the cartridge, said first sensor being provided near an opening of said concave portion, and wherein said second detecting means has a second sensor for detecting the second state of the cartridge which has been connected to said cartridge slot, said second sensor being provided at a position closed to said cartridge slot in said concave portion.

* * * * *